United States Patent
Ratnasingham (10) Patent No.: US 10,277,505 B2
(45) Date of Patent: Apr. 30, 2019

(54) ROUTING INTER-AS LSPS WITH CENTRALIZED CONTROLLER

(71) Applicant: Juniper Networks, Inc., Sunnyvale, CA (US)

(72) Inventor: Kumuthini Ratnasingham, Saratoga, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 175 days.

(21) Appl. No.: 15/084,769

(22) Filed: Mar. 30, 2016

(65) Prior Publication Data
US 2017/0289027 A1  Oct. 5, 2017

(51) Int. Cl.
- H04L 12/723 (2013.01)
- H04L 12/721 (2013.01)
- H04L 12/715 (2013.01)
- H04L 12/717 (2013.01)

(52) U.S. Cl.
CPC .......... H04L 45/50 (2013.01); H04L 45/04 (2013.01); H04L 45/12 (2013.01); H04L 45/42 (2013.01); H04L 45/507 (2013.01)

(58) Field of Classification Search
CPC ................ H04L 45/50; H04L 45/12
See application file for complete search history.

(56) References Cited

U.S. PATENT DOCUMENTS

| | | | | |
|---|---|---|---|---|
| 7,751,318 B2* | 7/2010 | Venkat | | H04L 45/02 370/230 |
| 8,885,463 B1* | 11/2014 | Medved | | H04L 45/50 370/228 |
| 8,953,500 B1* | 2/2015 | Shen | | H04L 45/16 370/238 |
| 9,350,661 B2* | 5/2016 | Murphy | | H04L 47/12 |
| 9,634,867 B2* | 4/2017 | Lee | | H04L 12/6418 |

(Continued)

FOREIGN PATENT DOCUMENTS

| | | |
|---|---|---|
| EP | 1684469 A1 | 7/2006 |
| WO | 2013184846 A1 | 12/2013 |

OTHER PUBLICATIONS

Extended Search Report from counterpart European Application No. 17163959.4, dated Sep. 11, 2017, 9 pp.

(Continued)

Primary Examiner — Zhiren Qin
(74) Attorney, Agent, or Firm — Shumaker & Sieffert, P.A.

(57) ABSTRACT

Techniques are described for routing inter-AS LSPs with a centralized controller taking inter-AS TE metric values for inter-AS links into account. The inter-AS TE metric values, e.g., local preference values, MED values, or EROS, indicate route preferences for routes between ASes. The disclosed techniques enable network devices within either or both of a first AS and a second AS to store inter-AS TE metric values for inter-AS links in TEDs of the network devices. The network devices then send the contents of their TEDs, including the inter-AS TE metric values, to a centralized controller of the first AS and the second AS. The centralized controller computes an inter-AS LSP across the first AS and the second AS based at least in part on the inter-AS TE metric values such that the inter-AS LSP includes a preferred one of the inter-AS links as indicated by the inter-AS TE metric values.

18 Claims, 6 Drawing Sheets

(56) References Cited

U.S. PATENT DOCUMENTS

| | | | | |
|---|---|---|---|---|
| 2006/0039391 | A1* | 2/2006 | Vasseur | H04L 45/04 370/409 |
| 2006/0165009 | A1* | 7/2006 | Nguyen | H04L 12/2854 370/252 |
| 2006/0193329 | A1* | 8/2006 | Asati | H04L 12/4641 370/395.53 |
| 2006/0200579 | A1 | 9/2006 | Vasseur et al. | |
| 2010/0265846 | A1* | 10/2010 | Weniger | H04L 45/04 370/254 |
| 2012/0224506 | A1* | 9/2012 | Gredler | H04L 45/04 370/254 |
| 2013/0034103 | A1* | 2/2013 | Chen | H04L 45/124 370/400 |
| 2013/0301619 | A1* | 11/2013 | Singh | H04W 56/004 370/336 |
| 2014/0129735 | A1* | 5/2014 | Thyni | H04L 45/14 709/241 |
| 2015/0146536 | A1* | 5/2015 | Minei | H04L 45/507 370/236 |
| 2016/0248664 | A1* | 8/2016 | Huang | H04L 45/64 |

OTHER PUBLICATIONS

Response to Extended Search Report dated Oct. 16, 2017, from counterpart European Application No. 17163959.4, filed Apr. 11, 2018, 5 pp.

"Northstar Controller Getting Started Guide," Juniper Networks, Inc., Nov. 6, 2015, 68 pp.

Coltun, "The OSPF Opaque LSA Option," RFC 2370, Network Working Group, Jul. 1998, 15 pp.

Crabbe et al., "PCEP Extensions for PCE-initiated LSP Setup in a Stateful PCE Model," Network Working Group Internet Draft, draft-crabbe-pce-pce-initiated-lsp-03, Oct. 10, 2013, 17 pp.

Gredler et al., "North-Bound Distribution of Link-State and Traffic Engineering (TE) Information Using BGP," RFC 7752, Internet Engineering Task Force (IETF), Mar. 2016, 48 pp.

Katz et al., "Traffic Engineering (TE) Extensions to OSPF Version 2," RFC 3630, Network Working Group, Sep. 2003, 14 pp.

Vasseur et al., "Path Computation Element (PCE) Communication Protocol (PCEP)," RFC 5440, Network Working Group, Mar. 2009, 87 pp.

Van De Velde, "BGP-Optimising the Foundational SDN Technology," Cisco Knowledge Network TechAdvantage Webinar, May 11, 2014, 46 pp.

"The BGP Multi Exit Discriminator (MED) attribute and tie-breaking," Noction Network Intelligence, retrieved from http://www.noction.com/blog/bgp-med-attribute, on Dec. 28, 2015, 5 pp.

Singh, "Yet Another New BGP NLRI:BGP-LS," Packet Pushers, retrieved from https://packetpushers.net/yet-another-new-bgp-nlri-bgp-ls, on Dec. 28, 2015.

Gredler et al., "North-Bound Distribution of Link-State and TE Information using BGP," Inter-Domain Routing Internet-Draft, draft-ietf-idr-ls-distribution-13, Oct. 16, 2015, 47 pp.

Crabbe et al., "PCEP Extensions for PCE-initiated LSP Setup in a Stateful PCE Model," PCE Working Group Internet-Draft, draft-ietf-pce-pce-initiated-lsp-05, Oct. 19, 2015, 17 pp.

"IGP Metric Copied to BGP MED," Cisco Support Community, retrieved from https://supportforums.cisco.com/discussion/10780696/igp-metric-copied-bgp-med, Dec. 28, 2015, 8 pp.

U.S. Appl. No. 14/500,736 by David C. Wood, filed Sep. 29, 2014.

Response to Examination Report dated Jul. 26, 2018, from counterpart European Application No. 17163959.4, filed Nov. 23, 2018, 13 pp.

Examination Report from counterpart European Application No. 17163959.4, dated Jul. 26, 2018, 7 pp.

* cited by examiner

ROUTING INTER-AS LSPS WITH CENTRALIZED CONTROLLER

TECHNICAL FIELD

The disclosure relates to communication networks.

BACKGROUND

A wide variety of customer devices connect to service provider networks to access resources and services provided by packet-based data networks, such as the Internet, enterprise intranets, content providers, and virtual private networks (VPNs). Each service provider network typically provides an extensive network infrastructure to provide packet-based data services to the customer devices. The service provider networks may comprise a wide area network (WAN). In some examples, each service provider network may comprise a single autonomous system (AS) within a WAN that includes multiple ASes. In other examples, each service provider network may comprise two or more ASes within the WAN.

The network infrastructure of a service provider network typically includes a vast collection of access nodes, aggregation nodes and high-speed edge routers interconnected by communication links. These network devices typically execute various protocols and exchange signaling messages to anchor and manage subscriber sessions and communication flows associated with customer devices. A software defined network (SDN) controller may be included in the network architecture to provide centralized control of the subscriber sessions and communication flows within the service provider network. In some cases, a SDN controller may provide centralized control over an entire WAN including multiple ASes. In this case, the SDN controller may be referred to as a SDN WAN controller or a SD-WAN controller.

SUMMARY

In general, this disclosure describes techniques for routing inter-autonomous system (AS) label switched paths (LSPs) with a centralized controller taking into account inter-AS traffic engineering (TE) metric values for inter-AS links. The inter-AS TE metric values indicate route preferences for routes between ASes, e.g., between a first AS and a second AS. The inter-AS TE metric values may include, e.g., local preference values for the inter-AS links that indicate a preferred outgoing route for a given AS, multiple exit discriminator (MED) values for the one or more inter-AS links that indicate a preferred incoming route for a given AS, or an explicit route object (ERO) that indicates a specific route between ASes.

The disclosed techniques enable network devices within either or both of a first AS and a second AS to store inter-AS TE metric values for one or more inter-AS links in traffic engineering databases (TEDs) of the network devices. The network devices then send the contents of their TEDs, including the inter-AS TE metric values, to a centralized controller coupled to the first AS and the second AS. According to the disclosed techniques, the centralized controller computes an inter-AS LSP across the first AS and the second AS based at least in part on the inter-AS TE metric values such that the inter-AS LSP includes a preferred one of the inter-AS links as indicated by the inter-AS TE metric values. In this way, the centralized controller computes the inter-AS LSP by taking the route preferences for the inter-AS links into account, instead of treating the inter-AS links simply as passive links.

In one example, this disclosure is directed to a method comprising receiving, by a network device within a first AS, inter-AS TE metric values for one or more inter-AS links that indicate route preferences for routes between the first AS and a second AS; storing the inter-AS TE metric values in a TED of the network device; sending, by the network device and to a centralized controller device coupled to the first AS and the second AS, contents of the TED including the inter-AS TE metric values; receiving, by the network device and from the centralized controller device, path information for an inter-AS LSP across the first AS and the second AS computed by the centralized controller device based on the contents of the TED, wherein the inter-AS LSP includes a preferred one of the one or more inter-AS links as indicated by the inter-AS TE metric values; and establishing, by the network device, at least a portion of the inter-AS LSP according to the path information.

In another example, this disclosure is directed to a network device comprising a memory, and one or more processors in communication with the memory. The one or more processors are configured to receive inter-AS TE metric values for one or more inter-AS links that indicate route preferences for routes between a first AS and a second AS, wherein the network device is within the first AS, store the inter-AS TE metric values in a TED of the network device, send contents of the TED including the inter-AS TE metric values to a centralized controller device coupled to the first AS and the second AS, receive, from the centralized controller device, path information for an inter-AS LSP across the first AS and the second AS computed by the centralized controller device based on the contents of the TED, wherein the inter-AS LSP includes a preferred one of the one or more inter-AS links as indicated by the inter-AS TE metric values, and establish at least a portion of the inter-AS LSP.

In a further example, this disclosure is directed to a method comprising receiving, by a centralized controller device coupled to a first AS and a second AS, contents of a TED of a network device within the first AS, wherein the contents of the TED include inter-AS TE metric values for one or more inter-AS links that indicate route preferences for routes between the first AS and the second AS; storing contents of the TED received from the network device within the first AS in one or more routing tables of the centralized controller device, wherein the one or more routing tables include contents of TEDs of a plurality of network devices within both the first AS and the second AS; computing, by the centralized controller device, an inter-AS LSP across the first AS and the second AS based on the one or more routing tables including the inter-AS TE metric values, wherein the inter-AS LSP includes a preferred one of the one or more inter-AS links as indicated by the inter-AS TE metric values; and sending, by the centralized controller device and to the network device within the first AS, path information for the inter-AS LSP in order to instruct the network device to establish at least a portion of the inter-AS LSP.

In an additional example, this disclosure is directed to a centralized controller device comprising a memory, and one or more processors in communication with the memory. The one or more processors are configured to receive contents of a TED of a network device within a first AS, wherein the contents of the TED include inter-AS TE metric values for one or more inter-AS links that indicate route preferences for routes between the first AS and a second AS, wherein the centralized controller device is coupled to the first AS and the second AS, store the contents of the TED received from the network device within the first AS in one or more routing tables of the centralized controller device, wherein the one or more routing tables include contents of TEDs of a plurality of network devices within both the first AS and the second AS, compute an inter-AS LSP across the first AS and the second AS based on the one or more routing tables including the inter-AS TE metric values, wherein the inter-AS LSP includes a preferred one of the one or more inter-AS links as indicated by the inter-AS TE metric values, and send, to the network device within the first AS, path information for the inter-AS LSP in order to instruct the network device to establish at least a portion of the inter-AS LSP.

The details of one or more examples are set forth in the accompanying drawings and the description below. Other features, objects, and advantages will be apparent from the description and drawings, and from the claims.

DETAILED DESCRIPTION

Figure 1:
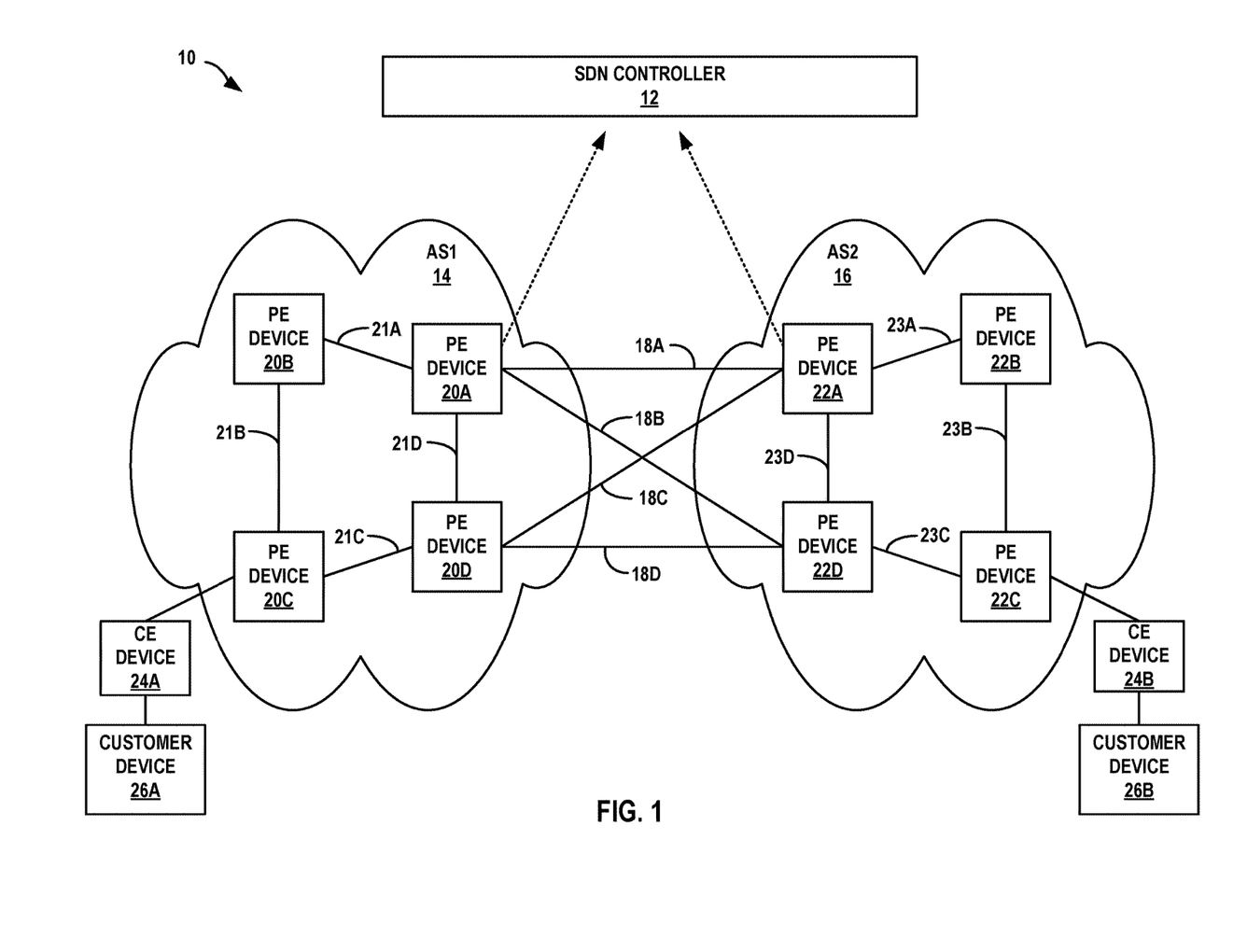
FIG. 1 is a block diagram illustrating an example network system including a software defined network (SDN) controller configured to route inter-autonomous system (AS) label switched paths (LSPs), in accordance with techniques described herein.

FIG. 1 is a block diagram illustrating an example network system 10 including a software defined network (SDN) controller 12 configured to route inter-autonomous system (AS) label switched paths (LSPs), in accordance with techniques described herein. The example network system 10 of FIG. 1 includes SDN controller 12 and a wide area network (WAN) having a first AS (AS1) 14 and a second AS (AS2) 16. SDN controller 12 of network system 10 operates as a high-level controller for the WAN. More specifically, SDN controller 12 provides centralized control of customer sessions and communication flows within the WAN by configuring and managing the routing and switching infrastructure within and between first AS1 14 and second AS2 16. In this case, SDN controller 12 may be referred to as a SDN WAN controller or a SD-WAN controller.

In one example, network system 10 may comprise a service provider network system that provides packet-based data services to customer devices 26A and 26B ("customer devices 26"). In this example, each of AS1 14 and AS2 16 comprises a collection of network devices under the control of one or more network service providers that presents a common, clearly defined routing policy. Customer device 26A may connect to AS1 14 and customer device 26B may connect to AS2 16 to access resources provided by packet-based data networks, such as the Internet, enterprise intranets, content providers, and virtual private networks (VPNs). A network service provider that administers one or both of AS1 14 and AS2 16 typically offers services to customer devices 26 that access the WAN of network system 10. Services offered may include, for example, traditional Internet access, VoIP, video and multimedia services, and security services.

In some cases, AS1 14 and AS2 16 may be administered by the same network service provider, and SDN controller 12 may be operated by that network service provider. In other cases, AS1 14 may be administered by a first network service provider and AS2 16 may be administered by a second, different network service provider. In those cases, SDN controller 12 may be operated by, for example, the first network service provider with cooperation from the second network service provider.

As illustrated in FIG. 1, customer device 26A connects to AS1 14 via customer edge (CE) device 24A and customer device 26B connects to AS2 16 via CE device 24B. In general, CE devices 24A and 24B ("CE devices 24") may be routers or switches controlled by customer networks. Customer devices 26 may be, for example, personal computers, laptop computers or other types of computing devices associated with customers. In addition, customer devices 26 may comprise mobile devices that access the data services provided by the WAN of network system 10 via a radio access network (RAN) (not shown). Example mobile subscriber devices include mobile telephones, laptop or desktop computers having, e.g., a 3G wireless card, wireless-capable netbooks, video game devices, pagers, smart phones, personal data assistants (PDAs) or the like.

Each of customer devices 26 may run a variety of software applications, such as word processing and other office support software, web browsing software, software to support voice calls, video games, video conferencing, and email, among others. Customer devices 26 connect to the WAN of network system 10 via wired and/or wireless communication links. The term "communication link," as used herein, comprises any form of transport medium, wired or wireless, and can include intermediate nodes such as network devices. Communication links may comprise, for instance, aspects of an asymmetric digital subscriber line (DSL) network, a Worldwide Interoperability for Microwave Access (WiMAX) network, a T-1 line, an Integrated Service Digital Network (ISDN), wired Ethernet, or a cellular radio link.

As illustrated in FIG. 1, AS1 14 includes provider edge (PE) devices 20A-20D ("PE devices 20") that are connected to each other via intra-AS links 21A-21D ("intra-AS links 21"). Similarly, AS2 16 includes PE devices 22A-22D ("PE devices 22") that are connected to each other via intra-AS links 23A-23D ("intra-AS links 23"). In general, PE devices 20 and PE devices 22 may be routers or switches controlled by a network service provider. In addition, AS1 14 and AS2 16 are connected via inter-AS links 18A-18D ("inter-AS links 18"). As shown in FIG. 1, PE device 20A within AS1 14 is connected to PE device 22A within AS2 16 via inter-AS link 18A, and PE device 22D within AS2 16 via inter-AS link 18B. In addition, PE device 20D within AS1 14 is connected to PE device 22A within AS2 16 via inter-AS link 18C, and PE device 22D within AS2 16 via inter-AS link 18D.

Each of PE devices 20 within AS1 14 and each of PE devices 22 within AS2 16 maintain a link state database (LSDB) and/or a traffic engineering database (TED) associated with a link state routing protocol of an interior gateway protocol (IGP), such as open shortest path first (OSPF) and intermediate system-to-intermediate system (IS-IS). The contents of the LSDB and/or TED of a given PE device, e.g., PE device 20A, describe links and nodes only within the respective AS of the given PE device, e.g., AS1 14 of PE device 20A.

Within AS1 14, PE devices 20 may communicate over intra-AS links 21 to exchange link state and traffic engineering (TE) information stored in the PE devices' LSDBs or TEDs using a border gateway protocol (BGP). In this way, each of PE devices 20 learns the topology and any TE constraints within AS1 14 in order to accurately route traffic through AS1 14. Within AS2 16, PE devices 22 operate in a similar manner and communicate over intra-AS links 23 to learn the topology and any TE constraints within AS2 16 in order to accurately route traffic through AS2 16.

As mentioned above, SDN controller 12 provides centralized control of customer sessions and communication flows within the WAN of network system 10. SDN controller 12, therefore, may configure and manage the routing and switching infrastructure within and between first AS1 14 and second AS2 16 (e.g., including PE devices 20, PE devices 22, and additional transit routers and switches not shown in FIG. 1). Further example details of an SDN controller are described in PCT International Patent Application PCT/US13/44378, filed Jun. 5, 2013, and U.S. patent application Ser. No. 41/500,736, filed Sep. 29, 2014, the entire contents of which are incorporated herein by reference.

In a conventional network system, a SDN controller learns intra-AS link state and TE metric values from TEDs of PE devices in the network system, but does not learn inter-AS TE metric values for inter-AS links. In general, the SDN controller does not learn the inter-AS TE metric values for the inter-AS links because the values are based on user configured preferences that are not stored in the LSDBs and/or TEDs of the PE devices. The inter-AS links are instead represented in the TEDs of the PE devices as passive links that include some link attributes but do not include traffic engineering information. The SDN controller may take the inter-AS links into consideration as passive links when computing inter-AS paths, but does not have the knowledge or control to select a preferred inter-AS route. The SDN controller may instead select inter-AS routes for the inter-AS paths based on a randomized or round-robin selection technique.

One example of an inter-AS TE metric value is a local preference value for a given inter-AS link that may be used to identify a preferred outgoing route of a given AS. For example, an administrator of AS1 14 may assign each of inter-AS links 18 a local preference value, and the one of inter-AS links 18 having the highest local preference value may be identified as the preferred outgoing route of AS1 14. Another example of an inter-AS TE metric value is a multiple exit discriminator (MED) value for a given inter-AS link that may be used to identify a preferred incoming route of a given AS. For example, the administrator of AS1 14 may assign each of inter-AS links 18 a MED value, and the one of inter-AS links 18 having the lowest MED value may be identified as the preferred incoming route of AS1 14. In some examples, an administrator of AS2 16 may assign the same or different local preference and MED values to inter-AS links 18. A further example of an inter-AS TE metric value is an explicit route object (ERO) that indicates a specific route between AS1 14 and AS2 16.

The inter-AS TE metric values may be configured by a user or an administrator of each of AS1 14 and AS2 16. The inter-AS TE metric values may then be flooded to PE devices 20 within AS1 14 or PE devices 22 within AS2 16 per IGP link state flooding procedures. In the case where AS1 14 and AS2 16 are administered by the same network service provider, the administrator of that network service provider may configure the inter-AS TE metric values for each of AS1 14 and AS2 16 to reflect the same inter-AS route preferences. In the case where AS1 14 is administered by a first network service provider and AS2 16 is administered by a second, different network service provider, the administrators for the first and second network service providers may need to work together to configure the inter-AS TE metric values for AS1 14 and AS2 16 to reflect the same inter-AS route preferences.

This disclosure describes techniques to enable SDN controller 12 to route inter-AS label switched paths (LSPs) while taking into account inter-AS TE metric values for inter-AS links 18. In order to compute an inter-AS LSPs between AS1 14 and AS2 16 with end-to-end TE, SDN controller 12 needs to learn the intra-AS link state and TE metric values as well as the inter-AS TE metric values from PE devices 20, 22 within each of AS1 14 and AS2 16.

The disclosed techniques enable PE devices 20, such as PE device 20A, for example, within AS1 14 to store the inter-AS TE metric values for inter-AS links 18 in a TED of PE device 20A. The TED of PE device 20A may also store the intra-AS TE metric values for intra-AS links 21 within AS1 14. In one example, PE device 20A may receive the configured inter-AS TE metric values directly from a user or administrator of AS1 14. In another example, PE device 20A may receive the configured inter-AS TE metric values in link state messages of an IGP, e.g., an Opaque link state advertisement (LSA) of OSPF or a link state packet (LSP) of IS-IS, from one of neighboring PE devices 20B-20D within AS1 14. In either example, upon receiving the configured inter-AS TE metric values, PE device 20A may advertise the inter-AS TE metric values to any of PE devices 20B-20D within AS1 14 in link state messages of IGP.

The disclosed techniques further enable PE device 20A, for example, to send the contents of its TED, including the inter-AS TE metric values, to SDN controller 12 using an extended version of the BGP routing protocol used to send or report link state and TE information to SDN controller 12. The extended version of BGP may be referred to as a link state attribute of BGP (BGP-LS). In some instances, the extended version of BGP may alternatively be referred to as BGP with link state extensions (BGP-LS). New type-length-values (TLVs) for BGP-LS are defined herein to carry each of the inter-AS TE metric values.

In FIG. 1, the BGP-LS communication carrying the TED contents of PE device 20A, including the inter-AS TE metric values associated with AS1 14, is illustrated as a dotted arrow from PE device 20A to SDN controller 12. A similar dotted arrow is illustrated from PE device 22A to SDN controller 12 to illustrate a BGP-LS communication carrying TED contents of PE device 20B, including inter-AS TE metric values associated with AS2 16. In this way, SDN controller 12 receives TED contents, including inter-AS TE metric values, from PE devices in both AS1 14 and AS2 16. Although described and illustrated with respect to PE device 20A within AS1 14 and PE device 22A within AS2 16, any of PE devices 20 within AS1 14 and PE devices 22 within AS2 16 may be configured to store inter-AS TE metric values in their TEDs and send the contents of their TEDs, including the inter-AS TE metric values, to SDN controller 12 using BGP-LS.

In accordance with the disclosed techniques, SDN controller 12 computes an inter-AS LSP across AS1 14 and AS2 16 based at least in part on the inter-AS TE metric values received from the PE devices 20, 22. In this way, SDN controller 12 computes the inter-AS LSP by taking the route preferences for inter-AS links 18 into account, instead of treating inter-AS links 18 simply as passive links. The computed inter-AS LSP, therefore, includes a preferred one of inter-AS links 18 as indicated by the inter-AS TE metric values. SDN controller 12 may then send path information for the computed inter-AS LSP to one or more of PE devices 20, 22 in order to instruct the PE devices to establish at least a portion of the inter-AS LSP. For example, PE device 20A within AS1 14 may receive the path information for the computed inter-AS LSP, and signal or establish at least a portion of the inter-AS LSP, e.g., by signaling the inter-AS path using the preferred one of inter-AS links 18.

Figure 2:
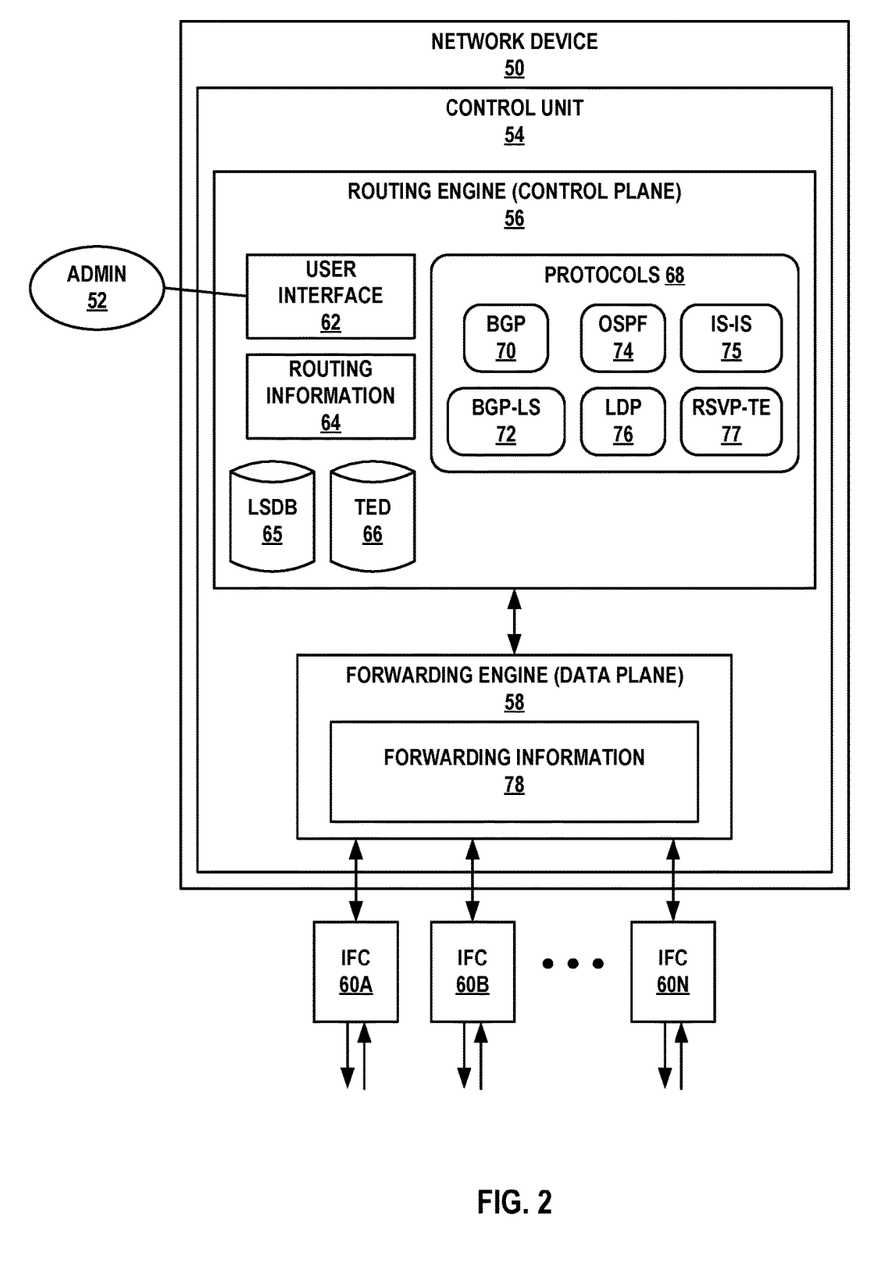
FIG. 2 is a block diagram illustrating an example network device configured to send inter-AS traffic engineering (TE) metric values, e.g., local preference and multiple exit discriminator (MED) values, to a centralized controller device, in accordance with the techniques of this disclosure.

FIG. 2 is a block diagram illustrating an example network device 50 configured to send inter-AS TE metric values, e.g., local preference and MED values, to a centralized controller device, in accordance with the techniques of this disclosure. For purposes of illustration, network device 50 may be described herein within the context of network system 10 of FIG. 1, and may represent any of PE devices 20 within AS1 14 or PE devices 22 within AS2 16, for example.

In the example of FIG. 2, network device 50 includes control unit 54 in which routing engine 56 provides control plane functionality for network device 50 and forwarding engine 58 provides data plane functionality for network device 50. Network device 50 also includes interface cards 60A-60N ("IFCs 60") that receive control and data packets via incoming links and send packets via outbound links. IFCs 60 are typically coupled to the incoming links and the outbound links via a number of interface ports. In general, control unit 54 determines routes of received packets and forwards the packets accordingly via IFCs 60.

Control unit 54 provides an operating environment for routing engine 56 and may be implemented solely in software, or hardware, or may be implemented as a combination of software, hardware or firmware. For example, control unit 54 may include one or more processors (not shown) which execute software instructions. In that example, routing engine 56 may include various software modules or daemons (e.g., one or more routing protocol processes, user interfaces and the like), and control unit 54 may include a computer-readable storage medium, such as computer memory or hard disk, for storing executable instructions.

Routing engine 56 operates as the control plane for network device 50 and includes an operating system (not shown) that may provide a multi-tasking operating environment for execution of a number of concurrent processes. For example, routing engine 56 provides an operating environment for various protocols 68 that perform routing functions for network device 50. As described in further detail below, protocols 68 provide control plane functions for storing network topology in the form of routing tables or other structures, executing routing protocols to communicate with peer routing devices and maintain and update the routing tables, and providing management interface(s) to allow user access and configuration of network device 50.

In the illustrated example of FIG. 2, routing engine 56 includes BGP 70 and IGP link state routing protocols OSPF 74 and IS-IS 75 as routing protocols used to exchange routing information with other network devices in the same AS in order to discover the topology of the AS and update routing information 64. Routing information 64 defines routes and the appropriate next hops for each route, i.e., the neighboring network devices along each of the routes, through the AS to destinations/prefixes within the AS learned via BGP 70. Routing information 64 also defines the network topology of the AS with interconnected links learned using OSPF 74 or IS-IS 75.

Routing engine 56 may maintain a link state database (LSDB) 65 configured to store link state information about nodes and links within the AS in which network device 50 resides. For example, LSDB 65 may include one or more of local/remote internet protocol (IP) addresses, local/remote interface identifiers, link metrics and TE metrics, link bandwidth, reservable bandwidth, class of service (CoS) reservation state, preemption, or shared risk link groups (SRLG). In addition, routing engine 56 may maintain a traffic engineering database (TED) 66 configured to store traffic engineering information. In accordance with the techniques of this disclosure, TED 66 is configured to store both intra-AS TE metric values and inter-AS TE metric values. The intra-AS TE metric values may include some or all of the metrics stored in LSDB 65 for nodes and links within the AS of network device 50. The inter-AS TE metric values may include one or more of local preference values that indicate a preferred outgoing route for the AS of network device 50, MED values that indicate a preferred incoming route for the AS of network device 50, or an ERO that indicates a specific route between the AS of network device 50 and a remote AS.

User interface 62 of routing engine 56 provides an interface by which an administrator 52 or other management entity may modify the configuration of network device 50. Using user interface 62, one or more management entities may enable/disable and configure services, install routes, enable/disable and configure rate limiters and configure interfaces, for example. In accordance with the techniques of this disclosure, routing engine 56 may receive inter-AS TE metric values for inter-AS links configured by administrator 52 via user interface 62. Routing engine 56 may then store the inter-AS TE metric values in TED 66. In other examples, routing engine 56 may receive the configured inter-AS TE metric values in Opaque LSAs of OSPF 74 or LSPs of IS-IS 75 from neighboring network devices.

Conventionally, inter-AS links are configured as passive links that include some link attributes but do not include traffic engineering information. The inter-AS links, therefore, are conventionally advertised in link state messages as passive links and included in TEDs of network devices as passive links.

As discussed above, the inter-AS TE metric values may include local preference values and MED values that are assigned to each of the inter-AS links. Local preference values are conventionally only carried in internal BGP (iBGP) messages within the AS of network device 50, and are not carried in external BGP (eBGP) messages. When the AS of network device 50 has more than one outgoing route to another AS, the local preference value for a given inter-AS link indicates the preference of one route over the other routes. For example, administrator 52 may assign each of the inter-AS links a local preference value where the highest local preference value indicates the preferred outgoing route from the AS. MED values are conventionally carried in both iBGP and eBGP messages. The MED values are used to influence how a neighbor AS enters the AS of network device 50 to reach a certain destination. For example, administrator 52 may assign each of the inter-AS links a MED value where the lowest MED value indicates the preferred incoming route to the AS.

According to the disclosed techniques, network device 50 may advertise the configured inter-AS TE metric values for the inter-AS links to neighboring network devices in the AS of network device 50 using an Opaque LSA of OSPF 74 or a LSP of IS-IS 75. Upon receiving the Opaque LSA or IS-IS LSP, the neighboring network devices may update their LSDBs and/or TEDs with the inter-AS TE metric values included in the link state messages.

In one example, a local preference value of an inter-AS link may conventionally be configured for advertisement using OSPF as follows:
    set protocols ospf area 0.0.0.0 interface ge-2/1/0.0 passive traffic-engineering remote-node-id 201.202.65.65
    set protocols ospf area 0.0.0.0 interface ge-2/1/0.0 passive traffic-engineering remote-node-router-id 65.0.0.201
    set protocols ospf area 0.0.0.0 interface ge-2/1/0.0 te-metric 999

According to the disclosed techniques, a local preference value of an inter-AS link may be configured for advertisement using OSPF 74 as follows: set protocols ospf area 0.0.0.0 interface ge-2/1/0.1 local preference 100. The variable name "local preference" and the local preference value of 100 are used herein for example purposes only. In other examples, a differently named variable may be used to represent the local preference value, and the local preference value may be set to any value capable of indicating a preferred outgoing inter-AS link within a plurality of inter-AS links.

In another example, a local preference value of an inter-AS link may conventionally be configured for advertisement using IS-IS as follows:
    set protocols isis interface xe-1/1/1.0 passive remote-node-iso 0100.0000.0202
    set protocols isis interface xe-1/1/1.0 passive remote-node-id 202.202.1.1
    set protocols isis interface xe-1/1/1.0 level 2 te-metric 999

According to the disclosed techniques, a local preference value of an inter-AS link may be configured for advertisement using IS-IS 75 as follows: set protocols isis interface xe-1/1/1.0 level 2 local preference 100. Again, the variable name "local_preference" and the local preference value of 100 are used herein for example purposes only. In other examples, a differently named variable may be used to represent the local preference value, and the local preference value may be set to any value capable of indicating a preferred outgoing inter-AS link within a plurality of inter-AS links.

In a further example, a MED value of an inter-AS link may conventionally be configured for advertisement using OSPF as follows:
    set protocols ospf area 0.0.0.0 interface xe-1/1/0.0 interface-type p2p
    set protocols ospf area 0.0.0.0 interface xe-1/1/0.0 passive traffic-engineering remote-node-id 202.202.1.2
    set protocols ospf area 0.0.0.0 interface xe-1/1/0.0 passive traffic-engineering remote-node-router-id 65.0.0.202
    set protocols ospf area 0.0.0.0 interface xe-1/1/0.0 metric 999

According to the disclosed techniques, a MED value of an inter-AS link may be configured for advertisement using OSPF 74 as follows: set protocols ospf area 0.0.0.0 interface ge-2/1/0.1 metric-out 30. The variable name "metric-out" and the MED value of 30 are used herein for example purposes only. In other examples, a differently named variable may be used to represent the MED value, and the MED value may be set to any value capable of indicating a preferred incoming inter-AS link within a plurality of inter-AS links.

In an additional example, a MED value of an inter-AS link may conventionally be configured for advertisement using IS-IS as follows:
    set protocols isis interface ge-2/0/0.0 passive remote-node-iso 0100.0000.0201
    set protocols isis interface ge-2/0/0.0 passive remote-node-id 201.202.1.1
    set protocols isis interface ge-2/0/0.0 level 2 te-metric 999

According to the disclosed techniques, a MED value of an inter-AS link may be configured for advertisement using IS-IS 75 as follows: set protocols isis interface ge-2/0/0.0 level 2 metric-out 30. Again, the variable name "metric-out" and the MED value of 30 are used herein for example purposes only. In other examples, a differently named variable may be used to represent the MED value, and the MED value may be set to any value capable of indicating a preferred incoming inter-AS link within a plurality of inter-AS links. In the example of OSPF 74, network device 50 may advertise the configured inter-AS TE metric values to neighboring network devices in an Opaque LSA. When the neighboring network devices receive the Opaque LSA, the inter-AS TE metric values included in the Opaque LSA will be updated and stored in LSDBs and/or TEDs of the neighboring network devices. The Opaque LSA of OSPF is described in more detail in R. Coltun, "The OSPF Opaque LSA Option," Network Working Group, IETF RFC 2370, July 1998, the entire contents of which are incorporated by reference herein. Moreover, the inclusion of intra-AS TE metric values in the Opaque LSA of OSPF is described in more detail in D. Katz, et al., "Traffic Engineering (TE) Extensions to OSPF Version 2," Network Working Group, IETF RFC 3630, September 2003, the entire contents of which are incorporated by reference herein.

An example of an OSPF LSDB, e.g., LSDB 65 of network device 50 for OSPF 74, is as follows.

```
root@vpn10-PE1# run show ospf database extensive
OSPF database, Area 0.0.0.0
Type     ID         Adv Rtr    Seq          Age    Opt    Cksum   Len
Router   *64.0.0.1  64.0.0.1   0x80000aa9   2268   0x22   0x1dc   96
  bits 0x2, link count 6
  id 164.1.250.0, data 255.255.255.0, Type Stub (3)
    Topology count: 0, Default metric: 1
  id 64.0.0.102, data 64.1.102.1, Type PointToPoint (1)
    Topology count: 0, Default metric: 1
  id 64.1.102.0, data 255.255.255.0, Type Stub (3)
    Topology count: 0, Default metric: 1
```

```
id 64.0.0.101, data 64.1.101.1, Type PointToPoint (1)
    Topology count: 0, Default metric: 1
id 64.1.101.0, data 255.255.255.0, Type Stub (3)
    Topology count: 0, Default metric: 1
id 64.0.0.1, data 255.255.255.255, Type Stub (3)
    Topology count: 0, Default metric: 0
Topology default (ID 0)
Type: PointToPoint, Node ID: 64.0.0.101
    Metric: 1, Bidirectional
Type: PointToPoint, Node ID: 64.0.0.102
    Metric: 1, Bidirectional
Gen timer 00:12:11
Aging timer 00:22:11
Installed 00:37:48 ago, expires in 00:22:12, sent 00:37:46 ago
Last changed 4d 04:31:36 ago, Change count: 3, Ours
```

An example of an OSPF TED, e.g., TED 66 of network device 50 for OSPF 74, that includes inter-AS TE metric values is as follows.

```
root@ns-mx240d-P4# run show ted database extensive
TED database: 0 ISIS nodes 15 INET nodes
NodeID: 64.0.0.1
Type: Rtr, Age: 2444 secs, LinkIn: 1, LinkOut: 2
Protocol: OSPF(0.0.0.0)
To: 64.0.0.101, Local: 64.1.101.1, Remote: 64.1.101.2
    Local interface index: 341, Remote interface index: 0
    Color: 0 <none>
    Metric: 1
    Local_Preference: 100
    MED: 30
    Static BW: 1000Mbps
    Reservable BW: 1000Mbps
    Available BW [priority] bps:
        [0] 643.9Mbps    [1] 643.9Mbps    [2] 643.9Mbps    [3] 643.9Mbps
        [4] 643.5Mbps    [5] 643.5Mbps    [6] 643.5Mbps    [7] 643.5Mbps
    Interface Switching Capability Descriptor(1):
    Switching type: Packet
    Encoding type: Packet
    Maximum LSP BW [priority] bps:
        [0] 643.9Mbps    [1] 643.9Mbps    [2] 643.9Mbps    [3] 643.9Mbps
        [4] 643.5Mbps    [5] 643.5Mbps    [6] 643.5Mbps    [7] 643.5Mbps
To: 64.0.0.102, Local: 64.1.102.1, Remote: 64.1.102.2
    Local interface index: 340, Remote interface index: 0
    Color: 0 <none>
    Metric: 1
    Static BW: 1000Mbps
    Reservable BW: 1000Mbps
    Available BW [priority] bps:
        [0] 1000Mbps     [1] 1000Mbps     [2] 1000Mbps     [3] 1000Mbps
        [4] 999.9Mbps    [5] 999.9Mbps    [6] 999.9Mbps    [7] 999.9Mbps
    Interface Switching Capability Descriptor(1):
    Switching type: Packet
    Encoding type: Packet
    Maximum LSP BW [priority] bps:
        [0] 1000Mbps     [1] 1000Mbps     [2] 1000Mbps     [3] 1000Mbps
        [4] 999.9Mbps    [5] 999.9Mbps    [6] 999.9Mbps    [7] 999.9Mbps
```

Returning to FIG. 2, routing engine 56 of network device 50 further includes BGP-LS 72 as an extended version of the BGP routing protocol used to send or report link state and TE information to a centralized controller device, e.g., SDN controller 12 from FIG. 1. According to the disclosed techniques, BGP-LS 72 may be used to send the contents of TED 66 to the centralized controller, including the inter-AS TE metric values. In BGP-LS 72, the MP_REACH_NLRI and MP_UNREACH_NLRI attributes are used to carry opaque information, including the inter-AS TE metric values. Examples of the newly defined TLVs used to carry local preference values and MED values are described in detail below with respect to FIGS. 4 and 5. The BGP-LS protocol by which BGP-LS 72 operates is described in additional detail in H. Gredler, et al., "North-Bound Distribution of Link-State and TE information using BGP: draft-ietf-idr-ls-distribution-13," Inter-Domain Routing Working Group, Internet Engineering Task Force (IETF) Internet-Draft, Oct. 16, 2015, the entire contents of which are incorporated herein by reference.

Routing engine 56 also provides an operating environment of one or more traffic engineering protocols to establish tunnels for forwarding packets through the AS in which network device 50 resides. For example, routing engine 56 includes label distribution protocol (LDP) 76 and resource reservation protocol with traffic engineering (RSVP-TE) 77 used to signal or establish LSPs within the AS based on routing information 64. In some examples, routing engine 56 may use LDP 76 or RSVP-TE 77 to establish at least a portion of an inter-AS LSP as computed by the centralized controller device.

Routing engine 56 analyzes routing information 64 to generate forwarding information 78 installed in forwarding engine 58. Forwarding engine 58 operates as the data plane for network device 50. Although not shown in FIG. 2, forwarding engine 58 may comprise a central processing unit (CPU), memory and one or more programmable packet-forwarding application-specific integrated circuits (ASICs). Forwarding information 78 is generated based on selection of certain routes within the AS and maps packet key information (e.g., destination information and other select information from a packet header) to one or more specific next hops and ultimately to one or more specific output interface ports of IFCs 60.

The architecture of network device 50 illustrated in FIG. 2 is shown for example purposes only and should not be limited to this architecture. In other examples, network device 50 may be configured in a variety of ways. In one example, some of the functionality of control unit 54 may be distributed within IFCs 60. Control unit 54 may be implemented solely in software, or hardware, or may be implemented as a combination of software, hardware, or firmware. For example, control unit 54 may include one or more of a processor, a programmable processor, a general purpose processor, an integrated circuit, an ASIC, a field programmable gate array (FPGA), or any type of hardware unit capable of implementing the techniques described herein. Control unit 82 may further include one or more processors which execute software instructions stored on a computer readable storage medium, such as random access memory (RAM), read only memory (ROM), programmable read only memory (PROM), erasable programmable read only memory (EPROM), electronically erasable programmable read only memory (EEPROM), non-volatile random access memory (NVRAM), flash memory, a hard disk, a CD-ROM, a floppy disk, a cassette, magnetic media, optical media, or other computer-readable storage media. In some instances, the computer-readable storage medium may include instructions that cause a programmable processor to perform the techniques described herein. For example, the various software modules of control unit 54 may comprise executable instructions stored on the computer-readable medium.

Figure 3:
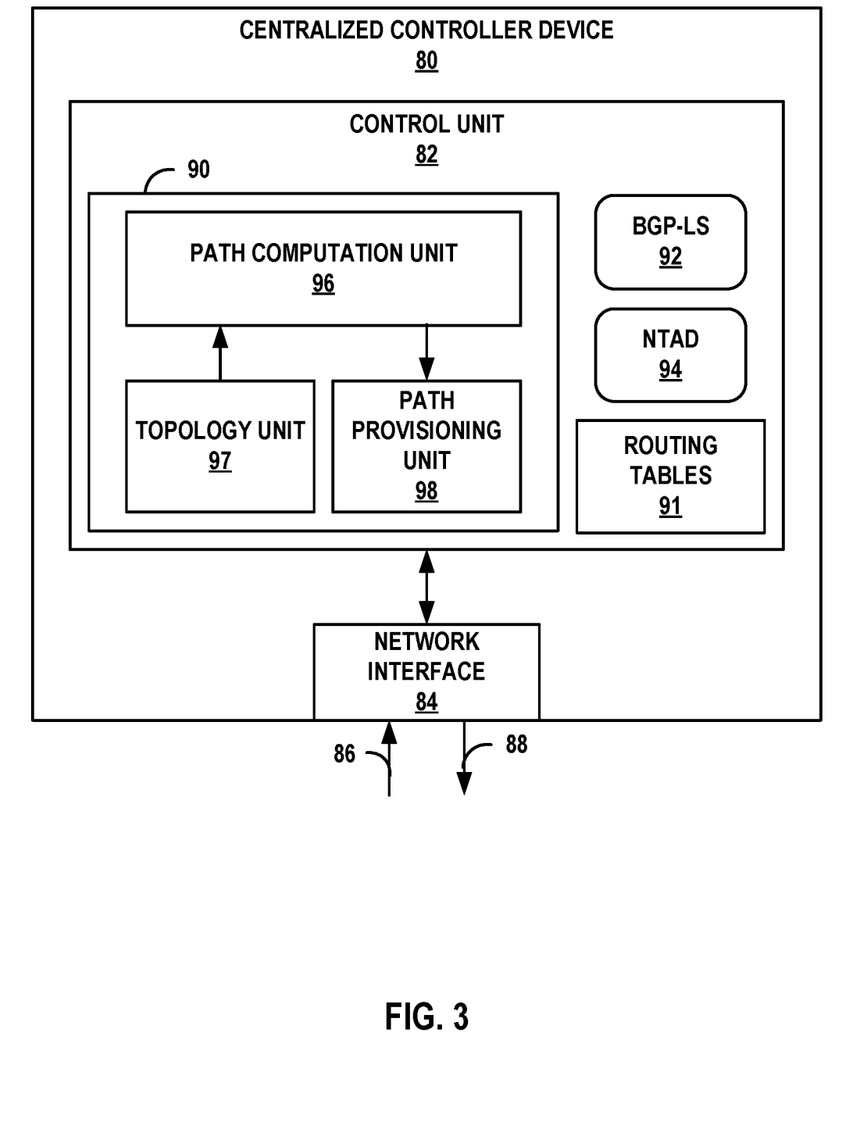
FIG. 3 is a block diagram illustrating an example centralized controller device configured to route inter-AS LSPs based on inter-AS TE metric values, e.g., local preference and MED values, in accordance with the techniques of this disclosure.

FIG. 3 is a block diagram illustrating an example centralized controller device 80 configured to route inter-AS LSPs based on inter-AS TE metric values, e.g., local preference and MED values, in accordance with the techniques of this disclosure. For purposes of illustration, centralized controller device 80 may be described herein within the context of network system 10 of FIG. 1, and may represent SDN controller 12. The architecture of centralized controller device 80 illustrated in FIG. 3 is shown for example purposes only and should not be limited to this architecture. In other examples, centralized controller device 80 may be configured in a variety of ways.

Centralized controller device 80 includes a control unit 82 coupled to a network interface 84 to exchange packets with other network devices by inbound link 86 and outbound link 88. Control unit 82 may include one or more processors (not shown) that execute software instructions, such as those used to define a software or computer program, stored to a computer-readable storage medium (not shown), such as non-transitory computer-readable mediums including a storage device (e.g., a disk drive, or an optical drive) or a memory (such as Flash memory or RAM) or any other type of volatile or non-volatile memory, that stores instructions to cause the one or more processors to perform the techniques described herein. Alternatively or additionally, control unit 82 may comprise dedicated hardware, such as one or more integrated circuits, one or more ASICs, one or more Application Specific Special Processors (ASSPs), one or more field programmable gate arrays (FPGAs), or any combination of one or more of the foregoing examples of dedicated hardware, for performing the techniques described herein.

Control unit 82 provides an operating environment for path computation element 90 and network topology abstractor daemon (NTAD) 94. In one example, these units may be implemented as one or more processes executing on one or more virtual machines of one or more servers. That is, while generally illustrated and described as executing on a single centralized controller device 80, aspects of these units may be delegated to other computing devices. Control unit 82 also provides an operating environment for several protocols, including BGP-LS 92.

In some examples, centralized controller device 80 may compute and establish inter-AS LSPs across a first AS and a second AS of a network, such as AS1 14 and AS2 16 of network system 10 from FIG. 1. As illustrated in FIG. 3, path computation element 90 includes a path computation unit 96, a topology unit 97 and a path provisioning unit 98. In order to compute the inter-AS LSPs with end-to-end TE, path computation element 90 needs to learn intra-AS link state and TE metric values for intra-AS links within each AS, and inter-AS TE metric values for inter-AS links. BGP-LS 92 is an extended version of the BGP routing protocol used to receive link state and TE information from network devices, e.g., PE devices 20, 22 within each of AS1 14 and AS2 16. According to the disclosed techniques, BGP-LS 92 may be used to receive the contents of TEDs of the network devices including inter-AS TE metric values that indicate inter-AS route preferences, e.g., local preference values, MED values, and/or EROS.

Control unit 82 of centralized controller device 80 stores the received TED contents in routing tables 91. Routing tables 91 may include the contents of TEDs of a plurality of network devices within both the first AS and the second AS. An example of routing tables 91 is as follows.

Lsdist.0—stores network topology data from TED
Lsdist.1—stores network topology data from IGP database Control unit 82 may also forward the received TED contents to NTAD 94. NTAD 94 may generate a network topology of the first AS and second AS based on the TED contents, and forward the topology data to topology unit 97 of path computation element 90. Topology unit 97 may receive the topology data describing available resources of the network, including access, aggregation, and edge nodes, interfaces thereof, and interconnecting communication links. In this way, the inter-AS TE metric values for the inter-AS links are included in the network topology and routing tables 91 used by path computation element 90 to compute inter-AS LSPs.

Path computation unit 96 of path computation element 90 may use the topology data received by topology unit 97 and routing tables 91 to compute inter-AS LSPs across the first AS and the second AS of the network. As an example, path computation unit 96 may compute a first portion of an inter-AS LSP through the first AS based on a first set of intra-AS metric values for the first AS. Path computation unit 96 may then compute a second portion of the inter-AS LSP between the first AS and the second AS that includes a preferred one of the inter-AS links based on the inter-AS metric values. Path computation unit 96 may also compute a third portion of the inter-AS LSP through the second AS based on a second set of intra-AS metric values for the second AS.

According to the disclosed techniques, when computing an inter-AS LSP, path computation unit 96 may select a preferred outgoing route for the first AS from a plurality of outgoing routes based on a local preference value as one of the inter-AS metric values. In addition, path computation unit 96 may select a preferred incoming route for the first AS from a plurality of incoming routes based on a MED value as another one of the inter-AS metric values. In this way, path computation element 90 computes the inter-AS LSP taking the route preferences for the inter-AS links into account, instead of treating the inter-AS links simply as passive links.

Upon computing the paths, path computation unit 96 may schedule the paths for provisioning by path provisioning unit 98. A computed path includes path information usable by path provisioning unit 98 to establish the path in the network. For example, path provisioning unit 98 may send the path information for the inter-AS LSP to network devices to instruct the network devices to establish at least a portion of the inter-AS LSP in the network. Provisioning a path may require path validation prior to committing the path to provide for packet transport.

Figure 4:
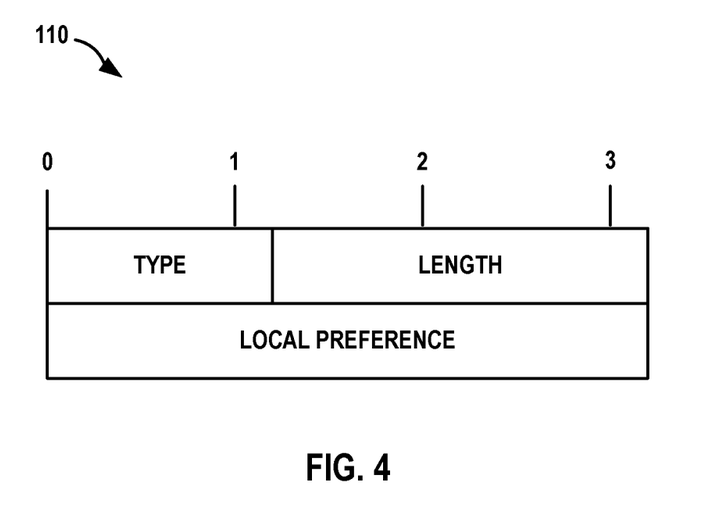
FIG. 4 is a conceptual diagram illustrating an example format of a local preference type-length-value (TLV) carried by a link state attribute of border gateway protocol (BGP-LS).

FIG. 4 is a conceptual diagram illustrating an example format of a local preference TLV 110 carried by BGP-LS. As described above, BGP-LS is an attribute of the BGP routing protocol used to carry link state and traffic engineering information from networks to external components, such as centralized controller device 12 from FIG. 1. Information carried in BGP-LS is encoded in Type Length Value (TLV) triplets. As illustrated in FIG. 4, local preference TLV 110 includes a type field, a length field, and the local preference value. The type field defines a type of the TLV used to identify the TLV. The length field defines the length of the local preference value in octets. The value field defines a local preference value for a given inter-AS link that can be used to identify a preferred outgoing route of a given AS. For example, an inter-AS link having a highest local preference value among a plurality of inter-AS links may be identified as the preferred outgoing route.

According to the techniques of this disclosure, BGP-LS carries the local preference TLV 110 from PE devices 20 in AS1 14 and PE devices 22 in AS2 16 to centralized controller device 12. The local preference TLV 110 carried by BGP-LS enables centralized controller device 12 to route inter-AS LSPs while taking the local preference value for the inter-AS links into account. In some cases, a similar local preference TLV may be carried in link state messages of an IGP. As one example, the local preference TLV may be carried in the Opaque LSA of the OSPF link state routing protocol as either a stand-alone TLV or as a sub-TLV. As another example, the local preference TLV may be carried in the IS-IS LSA. In some examples, local preference TLV 110 may be carried by all three protocols, i.e., BGP-LS, OSPF, and IS-IS, in the same network.

Figure 5:
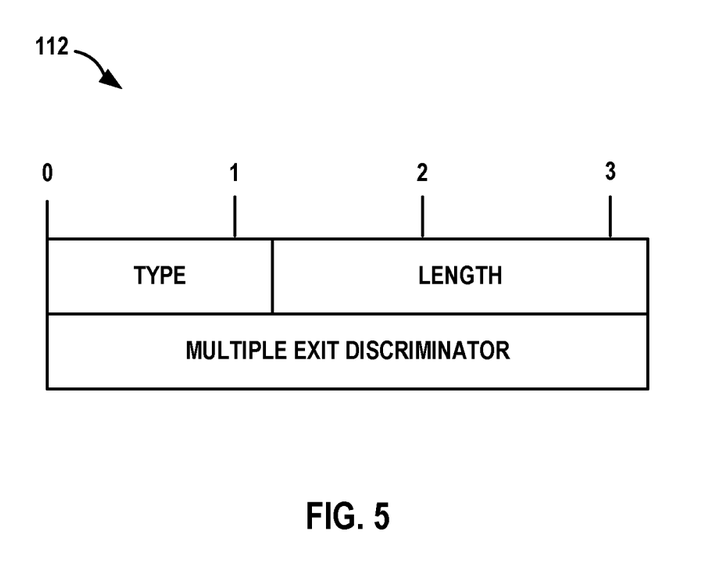
FIG. 5 is a conceptual diagram illustrating an example format of a MED TLV carried by BGP-LS.

FIG. 5 is a conceptual diagram illustrating an example format of a MED TLV 112 carried by BGP-LS. As described above, BGP-LS is an attribute of the BGP routing protocol used to carry link state and traffic engineering information from networks to external components, such as centralized controller device 12 from FIG. 1. Information carried in BGP-LS is encoded in Type Length Value (TLV) triplets. As illustrated in FIG. 5, MED TLV 112 includes a type field, a length field, and the MED value. The type field defines a type of the TLV used to identify the TLV. The length field defines the length of the local preference value in octets. The value field defines a MED value for a given inter-AS link that can be used to identify a preferred incoming route of a given AS. For example, an inter-AS link having a lowest MED value among a plurality of inter-AS links may be identified as the preferred incoming route.

According to the techniques of this disclosure, BGP-LS carries the MED TLV 112 from PE devices 20 in AS1 14 and PE devices 22 in AS2 16 to centralized controller device 12. The MED TLV 112 carried by BGP-LS enables centralized controller device 12 to route inter-AS LSPs while taking the MED value of a given AS into account. In some cases, a similar MED TLV may be carried in link state messages of an IGP. As one example, the MED TLV may be carried in the Opaque LSA of the OSPF link state routing protocol as either a stand-alone TLV or as a sub-TLV. As another example, the MED TLV may be carried in the IS-IS LSA. In some examples, MED TLV 112 may be carried by all three protocols, i.e., BGP-LS, OSPF, and IS-IS, in the same network.

Figure 6:
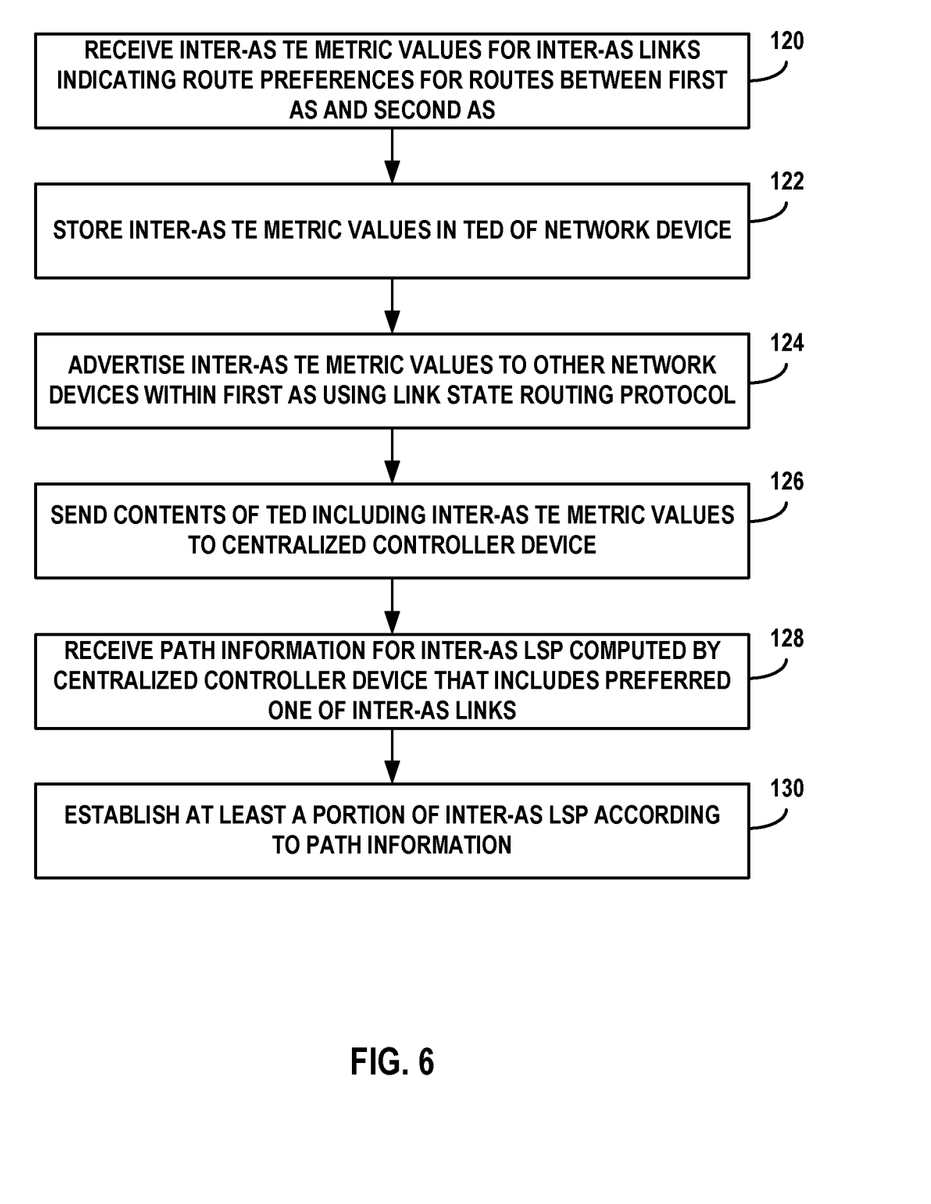
FIG. 6 is a flowchart illustrating an example operation of a network device sending inter-AS TE metric values to a centralized controller device, in accordance with the techniques of this disclosure.

FIG. 6 is a flowchart illustrating an example operation of a network device sending inter-AS TE metric values to a centralized controller device, in accordance with the techniques of this disclosure. The example operation of FIG. 6 will be described with respect to network device 50 from FIG. 2. In other examples, the operation illustrated in FIG. 6 may be performed by any of PE devices 20 within first AS 14 or PE device 22 within second AS 16 from FIG. 1.

Routing engine 56 of network device 50 within a first AS receives inter-AS TE metric values for one or more inter-AS links that indicate route preferences for routes between the first AS and a second AS (120). In one example, routing engine 56 may receive the inter-AS TE metric values directly from admin 52 of the first AS via user interface 62. In another example, routing engine 56 of network device 50 may receive the inter-AS TE metric values in link state messages of an IGP, e.g., an Opaque LSA of OSPF 74 or a LSP of IS-IS 75, from neighboring network devices within the first AS. In this example, admin 52 configures the inter-AS TE metric values, and the inter-AS TE metric values are then flooded to network devices within the first AS per IGP link state flooding procedures.

As described above, the inter-AS TE metric values for the inter-AS links may include one or more of local preference values that indicate a preferred outgoing route for the first AS, MED values that indicate a preferred incoming route for the first AS, or an ERO that indicates a specific route between the first AS and the second AS. Upon receiving the inter-AS metric values, routing engine 56 stores the inter-AS TE metric values in TED 66 of network device 50 (122). According to the disclosed techniques, TED 66 of network device 50 may store the inter-AS TE metric values for the inter-AS links and also store intra-AS TE metric values for intra-AS links within the first AS.

Routing engine 56 may then advertise the inter-AS TE metric values to other network devices within the first AS using a link state routing protocol of the IGP (124). In one example, the inter-AS TE metric values may be carried in an Opaque LSA of OSPF 74. In another example, the inter-AS metric values may be carried in a LSP of IS-IS 75. Routing engine 56 may advertise the intra-AS TE metric values in a similar manner.

In accordance with the disclosed techniques, routing engine 56 of network device 50 sends the contents of TED 66 including the inter-AS metric values to centralized controller device 12 of the first AS and the second AS (126). Routing engine 56 may send the contents of TED 66 to centralized controller device 12 using BGP-LS 72. The inter-AS TE metric values may be encoded in newly defined TLVs carried by BGP-LS 72, e.g., local preference TLV 110 from FIG. 4 and MED TLV 112 from FIG. 5.

Based on the contents of TED 66 of network device 50, centralized controller device 12 may compute an inter-AS LSP across the first AS and the second AS that takes the inter-AS TE metric values into account. Routing engine 56 of network device 50 then receives path information for the inter-AS LSP computed by centralized controller device 12 that includes a preferred one of the inter-AS links as indicated by the inter-AS TE metric values (128). The received path information for the inter-AS LSP indicates the route of the inter-AS LSP across the first AS and the second AS. Routing engine 56 of network device 50 then establishes at least a portion of the inter-AS LSP according to the path information (130).

Figure 7:
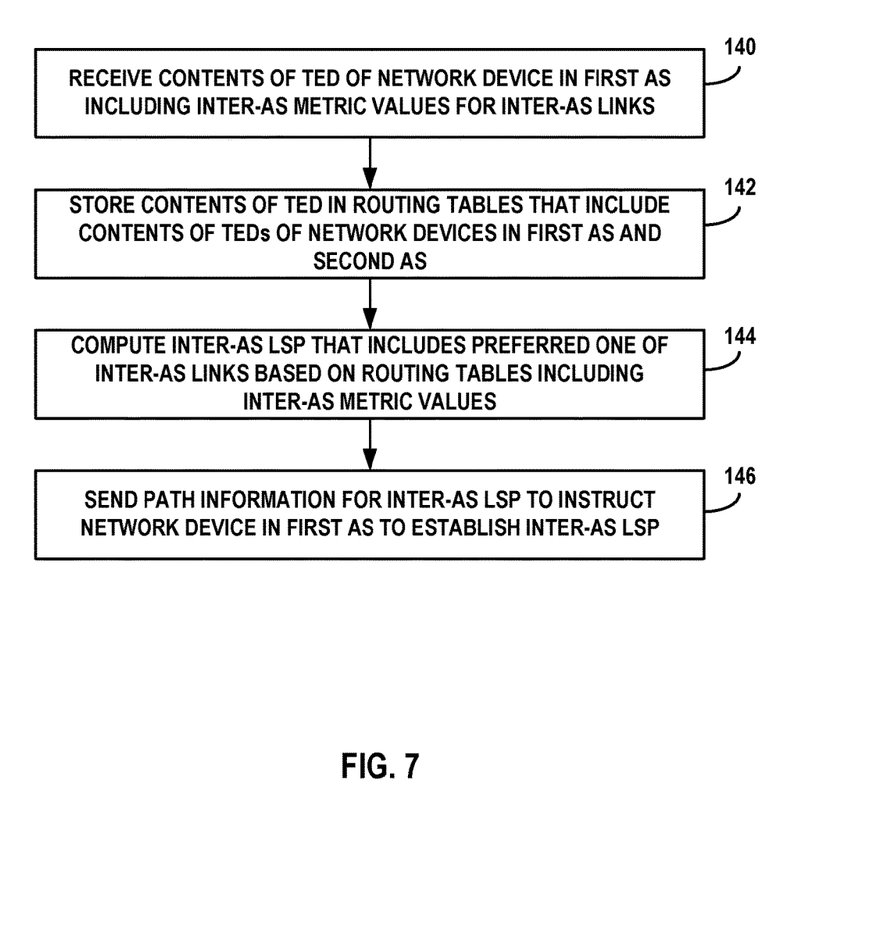
FIG. 7 is a flowchart illustrating an example operation of a centralized controller device routing inter-AS LSPs based on inter-AS TE metric values, in accordance with the techniques of this disclosure.

FIG. 7 is a flowchart illustrating an example operation of a centralized controller device routing inter-AS LSPs based on inter-AS TE metric values, in accordance with the techniques of this disclosure. The example operation of FIG. 7 will be described with respect to centralized controller device 80 from FIG. 3. In other examples, the operation illustrated in FIG. 7 may be performed by SDN controller 12 from FIG. 1.

Centralized controller device 80 comprises a controller coupled to both a first AS and a second AS. According to the disclosed techniques, control unit 82 of centralized controller device 80 receives contents of a TED of a network device within the first AS, including inter-AS TE metric values for one or more inter-AS links that indicate route preferences for routes between the first AS and the second AS (140). Control unit 82 of centralized controller device 80 may also receive contents of TEDs of network devices within either or both of the first AS and the second AS.

The TED of the network device within the first AS, for example, may include both the inter-AS TE metric values for the inter-AS links and intra-AS TE metric values for links within the first AS. As described above, the inter-AS TE metric values for the inter-AS links may include one or more of local preference values that indicate a preferred outgoing route for the first AS, MED values that indicate a preferred incoming route for the first AS, or an ERO that indicates a specific route between the first AS and the second AS. Control unit 82 may receive the contents of the TED of the network device in the first AS using BGP-LS 92. The inter-AS TE metric values may be encoded in newly defined TLVs carried by BGP-LS 92, e.g., local preference TLV 110 from FIG. 4 and MED TLV 112 from FIG. 5.

Control unit 82 of centralized controller device 80 stores the contents of the TED received from the network device within the first AS in routing tables 91 that include the contents of TEDs of a plurality of network devices within both the first AS and the second AS (142). In some examples, control unit 82 forwards the received TED contents to NTAD 94 running on control unit 82. NTAD 94 may generate a topology of the first AS and the second AS based on the TED contents, and forward the topology to topology unit 97 of path computation element 90. In this way, the inter-AS TE metric values for the inter-AS links are included in the network topology used by path computation element 90 to compute inter-AS LSPs.

Path computation element 90 of centralized controller device 80 then computes an inter-AS LSP that includes a preferred one of the inter-AS links based on routing tables 91 including the inter-AS TE metric values (144). For example, path computation element 90 may compute a first portion of the inter-AS LSP through the first AS based on a first set of intra-AS metric values for the first AS. Path computation element 90 may then compute a second portion of the inter-AS LSP between the first AS and the second AS that includes the preferred one of the inter-AS links based on the inter-AS TE metric values. Path computation element 90 may also compute a third portion of the inter-AS LSP through the second AS based on a second set of intra-AS metric values for the second AS.

According to the disclosed techniques, when computing the inter-AS LSP, path computation element 90 may select a preferred outgoing route for the first AS from a plurality of outgoing routes from the first AS to the second AS based on a local preference value as one of the inter-AS metric values. In addition, path computation element 90 may select a preferred incoming route for the first AS from a plurality of incoming routes to the first AS from the second AS based on a MED value as another one of the inter-AS metric values. In this way, path computation element 90 computes the inter-AS LSP taking the route preferences for the inter-AS links into account, instead of treating the inter-AS links simply as passive links.

Upon computing the inter-AS LSP, control unit 82 of centralized controller device 80 sends path information for the inter-AS LSP to the network device within the first AS in order to instruct the network device to establish at least a portion of the inter-AS LSP (146). The received path information for the inter-AS LSP indicates the route of the inter-AS LSP across the first AS and the second AS.

The techniques described in this disclosure may be implemented, at least in part, in hardware, software, firmware or any combination thereof. For example, various aspects of the described techniques may be implemented within one or more processors, including one or more microprocessors, digital signal processors (DSPs), ASICs, FPGAs, or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include RAM, ROM, PROM, EPROM, EEPROM, flash memory, a hard disk, a CD-ROM, a floppy disk, a cassette, magnetic media, optical media, or other computer-readable storage

What is claimed is:

1. A method comprising:
receiving, by a network device within a first autonomous system (AS), inter-AS traffic engineering (TE) metric values for one or more inter-AS links that indicate route preferences for routes between the first AS and a second AS;
storing the inter-AS TE metric values in a traffic engineering database (TED) of the network device;
sending, by the network device and to a centralized controller device coupled to the first AS and the second AS, contents of the TED including the inter-AS TE metric values;
receiving, by the network device and from the centralized controller device, path information for an inter-AS label switched path (LSP) across the first AS and the second AS computed by the centralized controller device based on the contents of the TED, wherein the inter-AS LSP comprises a first portion through the first AS based on a first set of intra-AS TE metric values for the first AS, a second portion between the first AS and the second AS that includes a preferred one of the one or more inter-AS links as indicated by the inter-AS TE metric values, and a third portion through the second AS based on a second set of intra-AS TE metric values for the second AS; and
establishing, by the network device, at least the second portion of the inter-AS LSP using the preferred one of the one or more inter-AS links according to the path information.

2. The method of claim 1, wherein the inter-AS TE metric values comprise one or more of local preference values for the one or more inter-AS links that indicate a preferred outgoing route for the first AS, multiple exit discriminator (MED) values for the one or more inter-AS links that indicate a preferred incoming route for the first AS, or an explicit route object (ERO) that indicates a specific route between the first AS and the second AS.

3. The method of claim 1, wherein sending the contents of the TED comprises sending the inter-AS TE metric values included in the TED to the centralized controller device using a link state attribute of a border gateway protocol (BGP-LS).

4. The method of claim 1, further comprising advertising the inter-AS TE metric values to other network devices within the first AS using a link state routing protocol of an interior gateway protocol (IGP), wherein the inter-AS TE metric values are carried in an Opaque link state advertisement (LSA) of an open shortest path first (OSPF) link state routing protocol.

5. The method of claim 1, further comprising advertising the inter-AS TE metric values to other network devices within the first AS using a link state routing protocol of an interior gateway protocol (IGP), wherein the inter-AS TE metric values are carried in a link state packet (LSP) of an intermediate system to intermediate system (IS-IS) link state routing protocol.

6. A network device comprising:
a memory; and
one or more processors in communication with the memory and configured to:
receive inter-AS traffic engineering (TE) metric values for one or more inter-AS links that indicate route preferences for routes between a first autonomous system (AS) and a second AS, wherein the network device is within the first AS,
store the inter-AS TE metric values in a traffic engineering database (TED) of the network device,
send contents of the TED including the inter-AS TE metric values to a centralized controller device coupled to the first AS and the second AS,
receive, from the centralized controller device, path information for an inter-AS label switched path (LSP) across the first AS and the second AS computed by the centralized controller device based on the contents of the TED, wherein the inter-AS LSP comprises a first portion through the first AS based on a first set of intra-AS TE metric values for the first AS, a second portion between the first AS and the second AS that includes a preferred one of the one or more inter-AS links as indicated by the inter-AS TE metric values, and a third portion through the second AS based on a second set of intra-AS TE metric values for the second AS, and
establish at least the second portion of the inter-AS LSP using the preferred one of the one or more inter-AS links according to the path information.

7. The network device of claim 6, wherein the inter-AS TE metric values comprise one or more of local preference values for the one or more inter-AS links that indicate a preferred outgoing route for the first AS, multiple exit discriminator (MED) values for the one or more inter-AS links that indicate a preferred incoming route for the first AS, or an explicit route object (ERO) that indicates a specific route between the first AS and the second AS.

8. The network device of claim 6, wherein the one or more processors are configured to send the inter-AS TE metric values included in the TED to the centralized controller device using a link state attribute of a border gateway protocol (BGP-LS).

9. The network device of claim 6, wherein the one or more processors are configured to advertise the inter-AS TE metric values to other network devices within the first AS using a link state routing protocol of an interior gateway protocol (IGP), wherein the inter-AS TE metric values are carried in an Opaque link state advertisement (LSA) of an open shortest path first (OSPF) link state routing protocol.

10. The network device of claim 6, wherein the one or more processors are configured to advertise the inter-AS TE metric values to other network devices within the first AS using a link state routing protocol of an interior gateway protocol (IGP), wherein the inter-AS TE metric values are carried in a link state packet (LSP) of an intermediate system to intermediate system (IS-IS) link state routing protocol.

11. A method comprising:
receiving, by a centralized controller device coupled to a first autonomous system (AS) and a second AS, contents of a traffic engineering database (TED) of a network device within the first AS, wherein the contents of the TED include inter-AS traffic engineering (TE) metric values for one or more inter-AS links that indicate route preferences for routes between the first AS and the second AS;
storing the contents of the TED received from the network device within the first AS in one or more routing tables of the centralized controller device, wherein the one or more routing tables include contents of TEDs of a plurality of network devices within both the first AS and the second AS;

computing, by the centralized controller device, an inter-AS label switched path (LSP) across the first AS and the second AS based on the one or more routing tables including the inter-AS TE metric values, wherein computing the inter-AS LSP comprises:

computing a first portion of the inter-AS LSP through the first AS based on a first set of intra-AS TE metric values for the first AS, computing a second portion of the inter-AS LSP between the first AS and the second AS that includes a preferred one of the one or more inter-AS links as indicated by the inter-AS TE metric values, and computing a third portion of the inter-AS LSP through the second AS based on a second set of intra-AS TE metric values for the second AS; and sending, by the centralized controller device and to the network device within the first AS, path information for the inter-AS LSP in order to instruct the network device to establish at least the second portion of the inter-AS LSP using the preferred one of the one or more inter-AS links.

12. The method of claim 11, wherein the inter-AS TE metric values comprise one or more of local preference values for the one or more inter-AS links that indicate a preferred outgoing route for the first AS, multiple exit discriminator (MED) values for the one or more inter-AS links that indicate a preferred incoming route for the first AS, or an explicit route object (ERO) that indicates a specific route between the first AS and the second AS.

13. The method of claim 11, wherein receiving the contents of the TED of the network device within the first AS comprises receiving the inter-AS TE metric values included in the TED via a link state attribute of a border gateway protocol (BGP-LS).

14. The method of claim 11, wherein computing the second portion of the inter-AS LSP between the first AS and the second AS comprises:

selecting a preferred outgoing route for the first AS from a plurality of outgoing routes from the first AS to the second AS based on a local preference value as one of the inter-AS TE metric values; and selecting a preferred incoming route for the first AS from a plurality of incoming routes to the first AS from the second AS based on a multiple exit discriminator (MED) value as another one of the inter-AS TE metric values.

15. A centralized controller device comprising:

a memory; and one or more processors in communication with the memory and configured to:

receive contents of a traffic engineering database (TED) of a network device within a first autonomous system (AS), wherein the contents of the TED include inter-AS traffic engineering (TE) metric values for one or more inter-AS links that indicate route preferences for routes between the first AS and a second AS, wherein the centralized controller device is coupled to the first AS and the second AS, store the contents of the TED received from the network device within the first AS in one or more routing tables of the centralized controller device, wherein the one or more routing tables include contents of TEDs of a plurality of network devices within both the first AS and the second AS, compute an inter-AS label switched path (LSP) across the first AS and the second AS based on the one or more routing tables including the inter-AS TE metric values, wherein, to compute the inter-AS LSP, the one or more processors are configured to:

compute a first portion of the inter-AS LSP through the first AS based on a first set of intra-AS TE metric values for the first AS, compute a second portion of the inter-AS LSP between the first AS and the second AS that includes a preferred one of the one or more inter-AS links as indicated by the inter-AS TE metric values, and compute a third portion of the inter-AS LSP through the second AS based on a second set of intra-AS TE metric values for the second AS, and send, to the network device within the first AS, path information for the inter-AS LSP in order to instruct the network device to establish at least the second portion of the inter-AS LSP using the preferred one of the one or more inter-AS links.

16. The centralized controller device of claim 15, wherein the inter-AS TE metric values comprise one or more of local preference values for the one or more inter-AS links that indicate a preferred outgoing route for the first AS, multiple exit discriminator (MED) values for the one or more inter-AS links that indicate a preferred incoming route for the first AS, or an explicit route object (ERO) that indicates a specific route between the first AS and the second AS.

17. The centralized controller device of claim 15, wherein the one or more processors are configured to receive the inter-AS TE metric values included in the TED of the network device within the first AS via a link state attribute of a border gateway protocol (BGP -LS).

18. The centralized controller device of claim 15, wherein, to compute the second portion of the inter-AS LSP between the first AS and the second AS, the one or more processors are configured to:

select a preferred outgoing route for the first AS from a plurality of outgoing routes from the first AS to the second AS based on a local preference value as one of the inter-AS TE metric values; and select a preferred incoming route for the first AS from a plurality of incoming routes to the first AS from the second AS based on a multiple exit discriminator (MED) value as another one of the inter-AS TE metric values.

* * * * *